United States Patent
Paping et al.

(10) Patent No.: US 6,427,133 B1
(45) Date of Patent: Jul. 30, 2002

(54) PROCESS AND DEVICE FOR EVALUATING THE QUALITY OF A TRANSMITTED VOICE SIGNAL

(75) Inventors: Martin Paping, Bellach (CH); Thomas Fahnle, Backnang (DE)

(73) Assignee: Ascom Infrasys AG, Solothurn (CH)

( * ) Notice: Subject to any disclaimer, the term of this patent is extended or adjusted under 35 U.S.C. 154(b) by 0 days.

(21) Appl. No.: 09/230,866

(22) PCT Filed: Jul. 31, 1997

(86) PCT No.: PCT/CH97/00289

§ 371 (c)(1),
(2), (4) Date: Apr. 19, 1999

(87) PCT Pub. No.: WO98/06196

PCT Pub. Date: Feb. 12, 1998

(30) Foreign Application Priority Data

Aug. 2, 1996 (CH) .................................. 1920/96

(51) Int. Cl.[7] ............................................. G10L 11/00
(52) U.S. Cl. ....................................... 704/201; 704/228
(58) Field of Search .................. 704/228, 226, 704/202, 233, 200.1, 201

(56) References Cited

U.S. PATENT DOCUMENTS 5,715,372 A * 2/1998 Meyers et al. ................. 706/16

FOREIGN PATENT DOCUMENTS

| EP | 0644674 | A2 | 3/1995 |
|---|---|---|---|
| EP | 0722164 | A1 | 7/1996 |
| WO | 94 00922 | | 1/1994 |
| WO | 95 15035 | | 6/1995 |
| WO | 96 06496 | | 2/1996 |

* cited by examiner

Primary Examiner—Tālivaldis Ivars Šmits
Assistant Examiner—Angela Armstrong

(57) ABSTRACT

For the automatic evaluation of the transmission quality of a voice signal that is transmitted by a digital transmission system (1) frequency components that correspond to a data frame rate ($f_r$) of the digital transmission system (1) are extracted from the received voice signal and analyzed. In order to obtain a measurement value that is independent of signal strength, a standardization with the spectral output values occurring in the middle of the quoted frequencies can be conducted. For comparison purposes, an undistorted voice signal is processed the same way in advance. The measurement values of the transmitted voice signal are placed at a ratio to the reference values and then evaluated, e.g., by a neuronal network (13).

18 Claims, 1 Drawing Sheet

PROCESS AND DEVICE FOR EVALUATING THE QUALITY OF A TRANSMITTED VOICE SIGNAL

TECHNICAL AREA

This application is the national phase under 35 U.S.C. §371 of prior PCT International Application No. PCT/CH97/00289 which has an International filing date of Jul. 31, 1997 which designated the United States of America.

The invention concerns a procedure for evaluation of the transmission quality of a voice signal, with the voice signal being sent from a transmitter to a receiver by a digital transmission system with a specified data frame rate and the transmission being distorted, and with the transmitted and distorted voice signal being subjected to a subsequent evaluation.

STATE OF THE ART

It is known that the transmission quality of mobile radio systems can vary dramatically. Signal strengths at the receiving location, the geographical environment and under certain circumstances the travel speed of the mobile radio participant play a role in this. It is not clear how disruptions occurring on a physical level (radio transmission path) affect the digitally transmitted voice signal and its intelligibility. Nor is it entirely clear to which physical disruption a subjectively noticed impairment of the intelligibility or loss of quality of the voice signal reproduced by the receiver's end (through a loudspeaker) can be attributed.

From EP 0 644 674 A2, we know of a procedure for evaluating transmission quality of a voice transmission path that enables evaluation on an automatic level, which correlates heavily to human perception. I.e., the system can conduct an evaluation of the transmission quality and apply a scale as would be done by a trained test listener. Basically, an integral quality evaluation process takes place. The causes of quality losses are not investigated.

EP 0 722 164 A1 describes a system for signal quality evaluation where the signal (which is, for example, a voice signal scanned with 8 KHz) is divided into blocks or frames of a specified length N. The spectral output density is calculated for each frame. Further processing is based on the frequency sensitivity of the outer human hearing apparatus.

Of course the operator of a mobile radio system is not only interested in evaluating transmission quality, but also in improving it. It is therefore desirable to recognize certain acoustically noticeable effects as such and to evaluate them. For example, disruptions can occur that cause the voice signal to sound like the voice of a robot ("robot voice" effect). Often voice distortions occur as well, which lead to meowing fluctuations in the signal ("ping-pong" effect).

PRESENTATION OF THE INVENTION

It is an object of the invention to provide a procedure of the kind mentioned above, which enables the identification of certain acoustically noticeable distortions and their weighting with regard to a signal quality impairment.

According to the invention, frequency components, which correspond with a data frame rate of the digital transmission system, are extracted from the transmitted voice signal and analyzed. At a frame length of e.g. 20 ms, the lowest frequency that is analyzed is 50 Hz. Preferably, not only the 50 Hz component is extracted, but also its harmonics, i.e. its integral multiples.

Analysis and calculation of a 'quality value' can be conducted in various ways. For example, the individual amplitude values can be determined and compared to a reference value. Several amplitude values can be summarized. Also, spectral output density values can be calculated and compared to reference values. According to a preferred version, the reference value is determined on the basis of a previously conducted analysis of the signal that is to be transmitted. For this, the signal components according to the invention are filtered and analyzed as required in order to determine the reference value. Of course several reference values can be established, for example in order to be able to conduct a classification.

Preferably not all integral multiples of the base frequency are evaluated, but rather only a limited number of frequencies. The upper limit for frequencies that are to be analyzed is, for example, within the maximum sensitivity range of human hearing, i.e., at 2–3 KHz. This way, relevant acoustical effects can be identified and quantified without difficulty in most cases, while limiting the time spent on calculations. The base frequency itself does not need to be analyzed. The smallest harmonic to be considered can be at 200 Hz, for example. Generally all harmonics between the lowest and the highest frequency Hmin and Hmax are taken into consideration. It is also feasible, however, to evaluate only certain selected frequencies instead of an uninterrupted series of frequencies. The selection of these frequencies can result from an analysis of the communication system's transmission behavior and the respective spectral output.

It is best to process the voice signal through a sliding window, i.e., the signal's digital values are weighted according to a specified window function with the goal of keeping frequency components caused by the block formation as small as possible. From the scanned values gathered into a block, a weighted measurement value is determined. The length of such a window should preferably be 4 times larger than the data frame.

For the weighting process of the frequency components determined in accordance with the invention, frequencies of the transmitted signal that are in between can be used, i.e. for a grid of, for example, 50 Hz (50, 100, 150, 200, . . . Hz) preferably the frequencies in between these frequency intervals (75, 125, 175, . . . Hz) are filtered to determine the amplitude or output weight. This way, an output-independent factor for evaluating the received voice signal can be determined. In order to identify certain effects with characteristic frequency pictures, the extracted frequency components can also be weighted individually if necessary. The appropriate weighting function can be established in advance or calculated on a case-by-case basis.

With regard to the highest possible stability of the evaluation system it is beneficial if only the largest value of a series of reference values is used for the reception-related evaluation. In other words, when working with a sliding window and determining a reference value for each window position according to a specified calculation procedure, the value calculated in this way for a certain window position is not used immediately, but rather the neighboring values are taken into consideration as well in order to then take the largest of them, for example, as the effective reference value (local maximum).

The circuit design on the receiving end for execution of the procedure in accordance with the invention includes a processor to obtain discreet Fourier transforms and to analyze the previously established frequency components. The required reference values are memorized.

The outlet side of the described circuit design provides for a neural network. (This network may, but is not required to be, implemented in a separate circuit; i.e., it can also be in the processor itself or in software form.) The neural network is trained in advance with various sample signals so that it can conduct the desired evaluation in real time. The circuit design according to the invention can be applied as a supplement to the system described in EP 0 644 674 A2, i.e., the measurement values determined in accordance with the invention are entered into the neural network in addition to already known preliminary values.

The following detailed description and summary of patent claims shows further advantageous versions and combinations of features of the invention.

BRIEF DESCRIPTION OF DRAWINGS

The invention will be best understood with reference to the accompanying drawings in which.

DETAILED DESCRIPTION OF A PREFERRED EMBODIMENT

Figure 1:
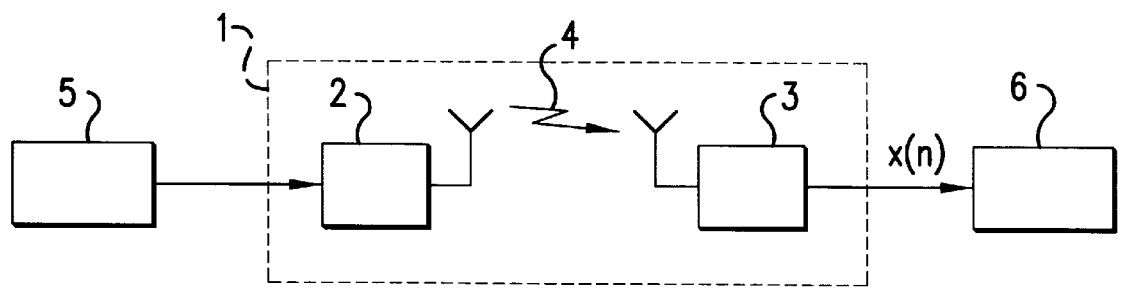
FIG. 1 illustrates a schematic view of the entire system.

FIG. 1 depicts a block diagram of the entire system. The transmission system that is to be tested is marked 1. Two terminals 2,3 (e.g., manual radio telephones) are connected with each other for communication via a transmission link that is not defined in detail, which typically is a radio link 4.

The transmission system 1 can be a common, complex telecommunication system, as described in detail for example in EP 0 644 674 A2 with the help of FIG. 1.

To be able to test the transmission system 1, a transmitter circuit 5 and a receiver circuit 6 are provided. (In reality, both a transmitter circuit 5 and a receiver circuit 6 will be hooked up to both terminals 2, 3 in order to be able to check the transmission system in both directions.)

The transmitter circuit 5 enters a voice signal into terminal 2. This can occur on an analog level, but preferably on a digital level. In the latter case, the transmitter circuit 5 is hooked directly to a digital transmitter switching circuit of terminal 2 (e.g., a mobile radio). For details of this known technology please refer to the EP 0 644 674 A2 mentioned above.

The voice signal is specified in an appropriate way; i.e., it contains several sentences or words of a certain language (typically a language used by the operators), with diverse voice sequences being spoken alternately by a male and a female. The length of a voice sequence is, for example 2–10 seconds. The voice signal can be formed out of any number of repetitions of a voice sequence. Also in this regard reference is made to EP 0 644 674 A2.

Figure 2:
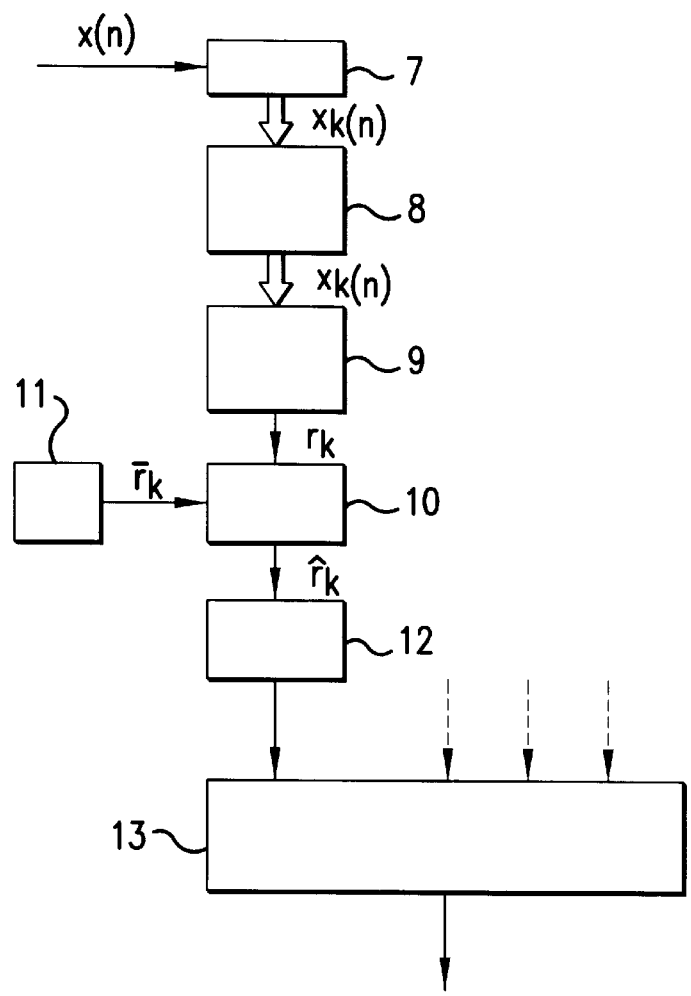
FIG. 2 is a block diagram to for explaining the procedure of the invention.

A new feature is the design of the receiver circuit 6. The signal processing realized through this circuit will be described more closely with reference to FIG. 2.

The scanned values x(n) of the transmitted and digitized audio or voice signal x(t) supplied by the transmission system 1 are first summarized into data blocks xk(n) of a specified length I in a data block generator 7. The successive data blocks xk(n) are offset from each other by one interval s (e.g. s=20 ms). In subsequent steps, each data block xk(n) is processed completely independently from the others. In order to minimize distortions created by the finite block length, the scanned values x(n) are weighted with a Hamming window function h(n). For the k-th window the following applies:

$$x_k(n) := x(n+k*s)*h(n) \quad \text{(I)}$$

with n=0 ... I−1 k=0, 1, 2, ...

In the next step, each data block xk(n) is transformed into the frequency range with a discreet Fourier transform (DFT) (DFT processor 8). The spectral output density can be estimated per interval s.

Xk(n) is to describe the frequency components of the data block xk(n):

$$X_k(n) := |F\{x_k(n)\}| \quad \text{(II)}$$

F describes the Fourier transform. The frequency resolution $\Delta f$ is:

$$\Delta f = \frac{f_N}{I} \quad \text{(III)}$$

with $f_N$ being the scanning frequency of the voice signal x (e.g. $f_N$=8 Khz).

The next step involves the process of determining a value that allows a quantitative statement about the strength of the repetition frequency $f_r$ determined by the data frame rate and its harmonics. In the following, we assume that the length of a data frame in the transmission system 1 is 20 ms, for example. The repetition frequency $f_r$ is then at 50 Hz.

According to a particularly preferred version, a characteristic value $r_k$ is now calculated as follows (in the computer 9):

$$r_k = \log \frac{\prod_{m=Hmin}^{Hmax} X_k\left(\left\lfloor \frac{mf_r}{\Delta f} \right\rfloor\right)}{\prod_{m=Hmin}^{Hmax} X_k\left(\left\lfloor \frac{\left(m+\frac{1}{2}\right)f_r}{\Delta f} \right\rfloor\right)} \quad \text{(IV)}$$

Hmin and Hmax describe the smallest and largest harmonic in the frequency range that is considered in the calculation. Hmin and Hmax are set in such a way that the largest portion of the corresponding spectral output is included. Preferably the harmonics in the range of 200–2000 Hz are included in the calculation. The output of the numerator is standardized by the spectral output values between the harmonics. In the example presented, the numerator is formed by the amplitudes occurring in the middle between the harmonics.

The logarithm is not absolutely necessary, however it ensures that the characteristic value $r_k$ is within a favorable value range for the subsequent evaluation. Please note that $r_k$ is independent of the entire signal output.

In the next step the measured characteristic value $r_k$ and a reference value $\overline{r}_k$ (per interval s) are compared. The quoted reference value is deduced, for example, as follows from the voice signal which is transmitted undistorted by the transmitter:

$$\overline{r}_k = \max\{r'_{k-w}, \ldots, r'_{k+w}\}$$

Values which result from evaluating the formula (IV) for the undistorted voice signal are described as $r'_k$.

In the presented example, a window with the width 2x+1 is placed around the k-th value $r'_k$ so that errors caused by inaccuracies of receiver-related synchronization are cushioned. Basically, this reduces the reference value's fluctuations. The width of the window is typically within a range of 3 to 15 values.

The reference values $\bar{r}_k$ are memorized in a register 11 and are issued to the divider 10 in the required sequence. This forms the following formula:

$$\hat{r}_k = \frac{r_k}{\bar{r}_k} \qquad \text{(VI)}$$

Finally, the ratio from formula (VI) is evaluated in a classifier 12, i.e. a signal is set for example if the ratio is larger than 1.5. Of course, also several classification ranges (e.g. limits) can be specified, with the classifier 12 indicating in which classification range the ratio value is.

The classification result is preferably evaluated with other parameters in a neural network. For examples of further parameters, please refer to EP 0 644 674 A2. In this case, the parameter in accordance with the invention represents a partial aspect of the entire transmission quality.

The distortions of the voice signal mentioned above can be identified, for example, if the ratio remains within a certain (higher) classification range for a certain period of time (i.e. for several intervals s). In the training phase (which precedes the utilization of the detector according to the invention), the neural network 13 learns to evaluate the voice signal (e.g. according to the classification "good", "average", "poor").

In summary, the invention provides a procedure which allows detailed analysis of transmission quality. In particular, it is possible to recognize effects which, for example, can be caused by the implemented error correction system, without intruding into the transmission system. It should be noted that no bit error rate or the like is evaluated, but rather the actual disruptive acoustical effect, since from the bit error rate one cannot directly deduce the extent of distortion perceived by the listener of the voice signal.

What is claimed is:

1. Procedure for the evaluation of the quality of a voice signal being transmitted from a transmitter to a receiver by a digital transmission system, wherein said signal is transmitted at a specified data frame rate and the transmission being distorted, comprising extracting from said signal those frequency components which correspond to a repetition frequency of the specified data frame rate of the transmission system and its harmonics and analyzing said components corresponding to said repetition frequency and said harmonics.

2. Procedure according to claim 1, wherein a reference value ($r'_k$) is deduced from a distortion-free voice signal and is then used for evaluating the transmission quality.

3. Procedure according to claim 2, wherein the reference values are generated through analysis of an undistorted voice signal as well as the distorted signal in the frequency range, and a local maximum is used as the effective reference value in a specified smoothing window (2x−1).

4. Procedure according to claim 1, wherein the received voice signal is summarized at specified intervals into data blocks (xk(n)), which are weighted or filtered with a window function.

5. Procedure according to claim 4, wherein the window function has a length of at least four times the length of a data frame.

6. Procedure according to claim 4 wherein a weighted measurement value ($r_k$) is determined for each interval, with the weighting being determined by the size of the middle frequency component that is between the frequency components which correspond to the data frame rate.

7. Procedure according to claim 1, wherein the frequency components are extracted only below or within the range of the human ear's maximum sensitivity.

8. Procedure according to claim 7, wherein the frequency components are extracted within the range of 200–2000 Hz.

9. A circuit evaluation of a voice signal's transmission quality comprising a data block generator for summarizing data of the transmitted and distorted voice signal according to a specified data frame rate, and a circuit for the valuation of transmission quality, wherein the circuit for the evaluation of transmission quality comprises a circuit for analyzing the transmitted voice signal's frequency components which correspond to the repetition frequency of the specified data frame rate of the transmission system and its harmonics.

10. A circuit according to claim 9, further comprising a register of reference values deduced from a distortion-free voice signal.

11. A circuit according to claim 9, wherein said evaluation circuit comprises a neural network which is trained to execute an evaluation of the transmission quality based on the determined measurement values.

12. Procedure for evaluation of the quality of a voice signal transmitted digitally by a transmission system at a specified data frame rate, comprising extracting from the transmitted signal those frequency components that correspond to a repetition frequency of the specified data frame rate of the transmission system and harmonics thereof;

summarizing the extracted components at specified intervals into data blocks; and determining for each interval a weighted measurement value by the size of the middle frequency component that is between the frequency components that correspond to the data frame rate.

13. Procedure as in claim 12, further comprising deducing a reference value from a distortion-free voice signal that is subsequently used for evaluating the transmission quality.

14. Procedure as in claim 13, wherein a local maximum is used as the effective reference value in a specified smoothing window.

15. Procedure as in claim 12, comprising extracting frequency components only within or below the range of sensitivity of the human ear.

16. Procedure as in claim 15, comprising extracting frequency components in the range of 200–2000 Hz.

17. Procedure as in claim 12, wherein each said interval is filtered with a window function.

18. Procedure as in claim 17, wherein the window function has a length at least four times the length of a data frame.

* * * * *